United States Patent
Keshava et al.

(10) Patent No.: US 10,931,568 B2
(45) Date of Patent: Feb. 23, 2021

(54) HITLESS MAINTENANCE OF A L3 NETWORK (71) Applicant: HEWLETT PACKARD ENTERPRISE DEVELOPMENT LP, Houston, TX (US)

(72) Inventors: A. Keshava, Karnataka (IN); Anil Raj, Karnataka (IN)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/129,207

(22) Filed: Sep. 12, 2018

(65) Prior Publication Data
US 2020/0007437 A1 Jan. 2, 2020

(30) Foreign Application Priority Data
Jul. 2, 2018 (IN) .............................. 201841024659

(51) Int. Cl.
*H04L 12/703* (2013.01)
*H04L 12/707* (2013.01)
*H04L 12/751* (2013.01)
*H04L 29/08* (2006.01)
*H04L 12/24* (2006.01)
*H04L 12/721* (2013.01)

(52) U.S. Cl.
CPC .......... *H04L 45/28* (2013.01); *H04L 41/0654* (2013.01); *H04L 41/082* (2013.01); *H04L 45/02* (2013.01); *H04L 45/12* (2013.01); *H04L 45/22* (2013.01); *H04L 67/104* (2013.01)

(58) Field of Classification Search
None
See application file for complete search history.

(56) References Cited

U.S. PATENT DOCUMENTS

| 7,355,983 | B2 | 4/2008 | Scudder et al. |
| 7,568,047 | B1* | 7/2009 | Aysan ..................... H04L 45/02 370/352 |
| 7,636,774 | B2 | 12/2009 | van Haalen et al. |
| 7,649,834 | B2 | 1/2010 | Badat et al. |
| 8,315,157 | B2 | 11/2012 | Moreno et al. |
| 2004/0249974 | A1* | 12/2004 | Alkhatib .......... H04L 29/12349 709/245 |
| 2005/0188106 | A1* | 8/2005 | Pirbhai ................. G06F 15/173 709/238 |

(Continued)

FOREIGN PATENT DOCUMENTS

WO 20161096005 A1 6/2016

OTHER PUBLICATIONS

Graceful BGP Session Shutdown, (Web Page), Jan. 4, 2018, 8 Pgs.

*Primary Examiner* — Duc T Duong
(74) *Attorney, Agent, or Firm* — Nolte Lackenbach Siegel (57) ABSTRACT

A method for use in exiting a portion of a node from an Internet Protocol, Layer 3 network includes: preparing the network for the portion to exit prior to the exit, including: notifying a set of peer nodes of the portion's exit; and rerouting traffic in the network away from the portion to the set of peer nodes; exiting the portion from the network once the traffic is rerouted; and reintroducing the exited portion to the network, including: notifying the peer nodes of the portion's reintroduction; and rerouting at least some of the traffic through the re-introduced portion.

17 Claims, 6 Drawing Sheets

(56) References Cited

U.S. PATENT DOCUMENTS

| | | | |
|---|---|---|---|
| 2006/0215578 A1* | 9/2006 | Andrapalliyal | H04L 12/4679 370/254 |
| 2009/0006603 A1* | 1/2009 | Duponchel | H04L 12/4641 709/223 |
| 2010/0278073 A1* | 11/2010 | Bhavanam | H04L 45/586 370/254 |
| 2010/0309920 A1* | 12/2010 | Rosenberg | H04L 45/021 370/395.53 |
| 2011/0164508 A1* | 7/2011 | Arai | H04L 45/60 370/245 |
| 2011/0310903 A1* | 12/2011 | Tu | H04L 45/04 370/392 |
| 2012/0089707 A1* | 4/2012 | Baba | H04L 41/022 709/220 |
| 2013/0067065 A1* | 3/2013 | Navasivasakthivelsamy | H04L 12/2809 709/224 |
| 2013/0117449 A1* | 5/2013 | Hares | H04L 45/04 709/225 |
| 2015/0043378 A1* | 2/2015 | Bardgett | H04L 12/4641 370/254 |
| 2015/0089331 A1* | 3/2015 | Skerry | G06F 9/45533 714/799 |
| 2015/0146531 A1 | 5/2015 | Welin et al. | |
| 2015/0341220 A1* | 11/2015 | Sikand | H04L 41/084 370/255 |
| 2015/0365313 A1* | 12/2015 | Chiba | H04L 12/4641 370/254 |
| 2016/0119251 A1* | 4/2016 | Solis | H04L 43/0876 709/224 |
| 2016/0142310 A1* | 5/2016 | Means | H04L 45/74 370/392 |
| 2016/0226766 A1* | 8/2016 | Al-Zoubi | H04L 45/64 |
| 2016/0239328 A1* | 8/2016 | Kaplan | G06F 9/45558 |
| 2016/0337169 A1* | 11/2016 | Chhabra | H04L 41/0672 |
| 2017/0126564 A1* | 5/2017 | Mayya | H04L 12/4633 |
| 2017/0141950 A1* | 5/2017 | Wackerly | H04L 43/0817 |
| 2017/0318087 A1* | 11/2017 | Qiu | H04L 65/00 |
| 2018/0278519 A1* | 9/2018 | Means | H04L 45/745 |

* cited by examiner

HITLESS MAINTENANCE OF A L3 NETWORK

CROSS-REFERENCE TO RELATED APPLICATIONS

This application claims the benefit of Indian Appl. No. 201841024659, filed Jul. 2, 2018. This application is incorporated herein by reference in its entirety to the extent consistent with the present application.

BACKGROUND

Many computing systems involve a large number of computers working together. One such arrangement is known as a "network", which is usually considered to be two or more computing systems linked together using certain industry standard protocols. Some networks even comprise multiple networks linked together in this manner. The computers that constitute the network are sometimes called "nodes". Some nodes consume network resources and/or services and are considered "clients" and some nodes provide network resources and/or services and are considered "servers". Some nodes may be both clients and servers depending upon context.

BRIEF DESCRIPTION OF THE DRAWINGS

Examples described herein may be understood by reference to the following description taken in conjunction with the accompanying drawings, in which like reference numerals identify like elements.

While examples described herein are susceptible to various modifications and alternative forms, the drawings illustrate specific embodiments herein described in detail by way of example. It should be understood, however, that the description herein of specific embodiments is not intended to be limiting to the particular forms disclosed, but on the contrary, the intention is to cover all modifications, equivalents, and alternatives falling within the spirit and scope of the examples described herein and the appended claims.

DETAILED DESCRIPTION

Illustrative embodiments of the subject matter claimed below will now be disclosed. In the interest of clarity, not all features of an actual implementation are described in this specification. It may be appreciated that in the development of any such actual embodiment, numerous implementation-specific decisions may be made to achieve the developers' specific goals, such as compliance with system-related and business-related constraints, which will vary from one implementation to another. Moreover, it may be appreciated that such a development effort, even if complex and time-consuming, would be a routine undertaking for those of ordinary skill in the art having the benefit of this disclosure.

Large computer networks have become almost ubiquitous. Even personal computers are frequently a part of the extremely large network that is the Internet. Of particular interest to some in the industry are what are known as "enterprise computing systems". These are usually very large networks used and maintained by large organizations that may be public (e.g., national and/or local governments) or private (e.g., for profit corporations, non-governmental organizations, etc.). Many times these enterprise computing systems have emerged and/or evolved over time as these organizations grow or otherwise change. One aspect of the kinds of changes over time that occur to a network is that the network, or at least various portions of it, will undergo maintenance. This maintenance may be to upgrade or replace software or hardware, for example. It may include changes to capabilities or topology. These kinds of changes are examples only, and there are many other ways in which maintenance may be used to help the network change to meet the purposes for which it is used.

One part of operating even a large network is that the users of the network expect for the maintenance to be transparent to their computing experience. If some server, for example, providing services to the user is taken down for maintenance, the user still expects to be able to use those services without adverse impact to their computing experience. Network administrators are cognizant of this expectation and consider this an element in the performance of the network.

In at least one embodiment, the subject matter claimed below includes a method for use in exiting a portion of a node from an Internet Protocol, Layer 3 network. In this context, "exiting" means to remove the node or at least a portion of the node from the network. A node that has been removed from the network has "exited" the network. This method includes: preparing the network for the portion to exit prior to the exit, exiting the portion from the network once the traffic is rerouted, and reintroducing the exited portion to the network. Preparing the network for exit includes notifying a set of peer nodes of the portion's exit and rerouting traffic in the network away from the portion to the set of peer nodes. Reintroducing the exited portion to the network includes notifying the peer nodes of the portion's reintroduction and rerouting at least some of the traffic through the re-introduced portion.

In some embodiments, an Internet protocol, Layer 3 network, includes: a plurality of networks; a plurality of nodes across which the networks are distributed; a processor; and a maintenance manager. The maintenance manager, when executed by the processor, performs a method including: preparing the network for a portion of one of the nodes on which at least one of the networks resides to exit prior to the exit, exiting the portion from the network once the traffic is rerouted, and reintroducing the exited portion to the network. Preparing the network for exit includes notifying a set of peer nodes of the portion's exit and rerouting traffic in the network away from the portion to the set of peer nodes. Reintroducing the exited portion to the network includes notifying the peer nodes of the portion's reintroduction and rerouting at least some of the traffic through the re-introduced portion.

In one or more embodiments, a non-transitory computer-readable medium stores computer-executable instructions that when executed by a computer cause the computer to: prepare the network for the portion to exit prior to the exit, exit the portion from the network once the traffic is rerouted, and reintroduce the exited portion to the network. Preparing the network for exit includes notifying a set of peer nodes of the portion's exit and rerouting traffic in the network away from the portion to the set of peer nodes. Reintroducing the exited portion to the network includes notifying the peer nodes of the portion's reintroduction and rerouting at least some of the traffic through the re-introduced portion.

Figure 1:
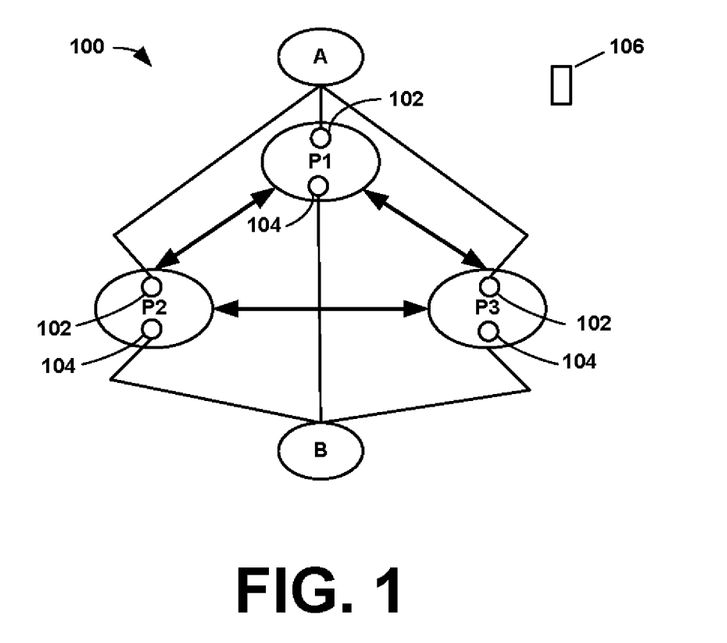
FIG. 1 conceptually illustrates selected portions of a computing network in one particular embodiment implemented within the scope of the subject matter claimed below.

Turning now to FIG. 1, selected portions of a computing network 100 are conceptually shown. The computing network 100 may be a physical or a virtual network and employs an Internet Protocol ("IP"), and so is a packet-based network. That is, communications are broken down into "packets" that are individually routed through the computing network 100 to their destination. Note that the destination may be, in some instances, external to the computing network 100. For example, a communication may be directed to a destination on the Internet provided that the computing network 100 interfaces with the Internet. The IP defines how this is done and is a standard of the industry. The particular version of the IP is not material and may be, for instance, Internet Protocol version 4 ("IPv4") or Internet Protocol version 6 ("IPv6").

For purposes of illustration, computing network 100 includes three nodes P1, P2, and P3. Those in the art having the benefit of this disclosure will appreciate that many networks will have many more nodes. Some may have hundreds or thousands of nodes or even more. The number three is chosen here for clarity and ease of illustration so as not to obscure that which is claimed below. Alternative embodiments may employ different numbers of nodes.

Computer networks may include a wide variety of different kinds of nodes. Non-limiting examples of nodes include modems, hubs, bridges, and switches. In the embodiment of FIG. 1, the nodes P1, P2, and P3 are all routers. Routers perform the traffic directing functions of the computing network 100 for the packets (not shown). As noted above, communications are broken down into packets and the packets are individually forwarded through the computing network 100 to their destination. They typically are routed through one or more of the routers, from router to router, until they reach their destination.

More particularly, each packet includes addressing information for its destination. The router includes a "routing table" that it uses to determine from the addressing information the route for the packet to its destination. Sometimes it also includes the distance associated with that route. Thus, when a router receives a packet, it reads the addressing information and consults its routing table. The routing table includes the route to the destination from which the router can determine to which "peer" router it should forward the packet. The router then forwards the packet to the next router. (If the receiving router is the last router on the route, then it forwards the packet on to its destination.)

Returning to FIG. 1, the computing network 100 employs the Open Systems Interconnection ("OSI") model that is another industry standard. The OSI model defines certain functionalities of the network as "layers". For example, the machines and their interconnections are considered the "physical layer" and are labeled "layer 1". The technique disclosed herein operates at the "network layer", or "layer 3", sometimes called "L3". L3 is responsible for switching and routing packets and so transmitting data between the nodes of the network among other things. The computing network 100 can therefore, in the context of the subject matter claimed below, be referred to as an L3 network.

The computing network 100 includes a plurality of constituent networks that may be referred to as "virtual networks" for present purposes. The embodiment of FIG. 1 includes two virtual networks—virtual network A and virtual network B. The number of virtual networks has been chosen for clarity and ease of illustration so as not to obscure that which is claimed below. Alternative embodiments may employ different numbers of virtual networks. Some embodiments, however, may omit virtual networks.

As the label implies, each of the virtual network A and Virtual network B is a "virtual network". A virtual network may be considered a network of "virtual machines". A virtual machine is a software construct emulating a physical machine. To the user, a virtual machine appears to be a physical machine but the software construct is not necessarily hosted on any particular physical machine. The virtual machine may use physical computing resources from several different physical machines. Nevertheless, the virtual machine performs and is managed as though it were a single machine.

One implication of the virtualization is that the virtual networks are not necessarily tied to any particular computing resources within the computing network 100. Conversely, none of the computing resources within the computing network 100 is necessarily tied to the virtual networks. Virtualization provides the computing network 100 the flexibility to reassign computing resources to various virtual networks as needed or desired. Another implication of virtualization is that the virtual networks may "share" computing resources. Thus, as conceptually shown in FIG. 1, portions of virtual network A are hosted on each of nodes P1, P2, and P3 as are portions of virtual network B.

Virtual network A and virtual network B are, more particularly, "virtual routing and forwarding" ("VRF") networks. This is a type of virtual network in which multiple instances of a routing table may exist in the same router at the same time. So, for example, each of the nodes P1, P2, and P3 may maintain two different routing tables, one for virtual network A and one for virtual network B. The routing information in one routing table is independent from the routing information in the second table. Because the routing information is independent, IP addresses of various computing resources can be used by both routing tables without conflict. Distinct routing tables are sometimes referred to as "forward information bases".

Figure 2:
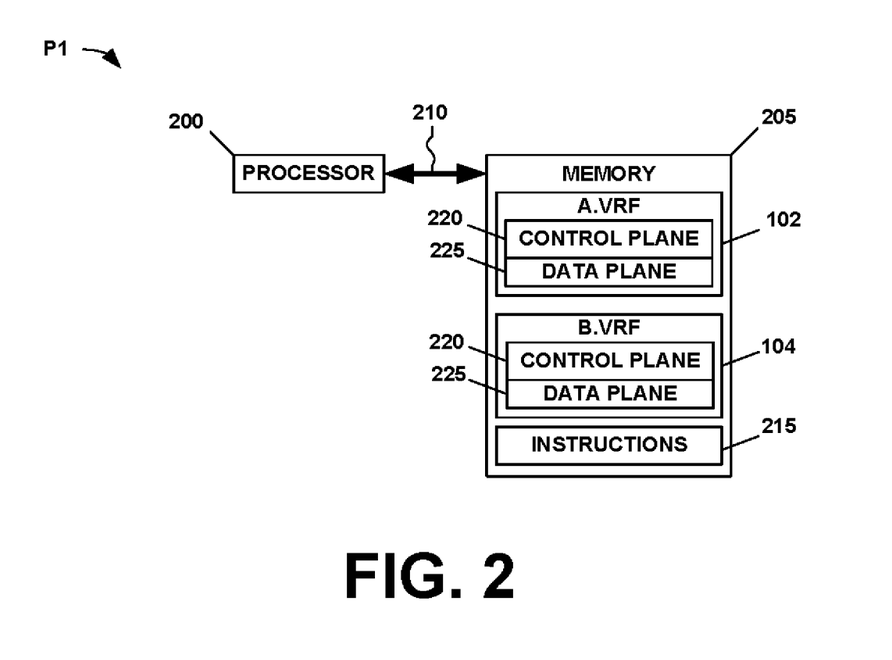
FIG. 2 illustrates selected portions of the hardware and software architecture of a representative node of the computing network in FIG. 1.

FIG. 2 illustrates selected portions of the hardware and software architecture of the node P1. Nodes P2 and P3 are similar in the illustrated aspects. The node P1 includes at least a processor 200 and a memory 205 communicating over a bus system 210. The memory 205 includes a portion 102 of virtual network A (i.e., "A.vrf") and a portion 104 of virtual network B (i.e., "B.vrf"). The memory also includes a set of instructions 215 that, when executed by the processor 200, perform a method as described and claimed below. Each portion 102, 104 includes a portion of a Control Plane 220 and a portion of a Data Plane 225.

Figure 3:
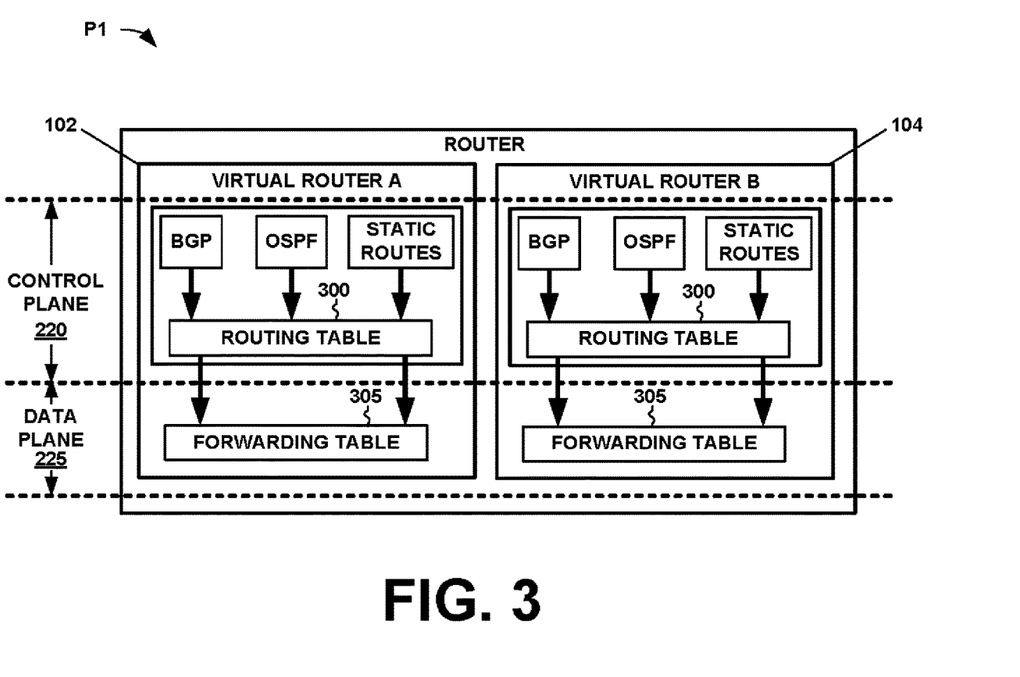
FIG. 3 conceptually illustrates the Control Plane and Data Plane of the virtual network portions in FIG. 1 on the representative node of FIG. 2.

The Control Plane 220 and Data Plane 225 are conceptually illustrated in FIG. 3. As noted above and as indicated in FIG. 3, the node P1 in the illustrated embodiment is a router. The portions 102, 104 hosted on the node P1 are "virtual routers". Each portion 102, 104, again as noted above, includes a portion of a Control Plane 220 and a portion of a Data Plane 225.

Each of the portions 102, 104 includes a routing table 300 as described above. The routing table 300 is built in part "dynamically". The "dynamic" portions of the routing table 300 may vary over time as the computing network 100 and its operating conditions change. The dynamic portions are automatically using various routing protocols that automatically (i.e., by program and without human intervention) discover characteristics of the computing network 100 such as its topology.

Routing protocols such as Border Gateway Protocol ("BGP"), an exterior gateway protocol, and Open Shortest Path First ("OSPF"), an interior gateway protocol, may be used to build the dynamic portion of the routing table 300. BGP is a path vector protocol and makes routing decisions based on a number of factors such as paths, network policies, or rules-sets configured by a network administrator. The illustrated embodiment uses BGP Version 4 ("BGP4"). OSPF calculates the shortest path through a network based on factors like cost, bandwidth, delay, and load. The illustrated embodiment uses OSPF Version 3. Note that alternative embodiments may use different versions of these protocols or even different protocols depending on the implementation of the computing network 100.

The routing table is also built in part "statically". The static portions are developed by non-automatic means. This typically means entry by, for example, a network administrator. The static portions of the routing table usually pertain to aspects of the computing network 100 that are not fixed and do not change if the network is changed or reconfigured.

The Data Plane 225 is a part of the computing network 100 through which user packets are transmitted. It is a conceptualization of the flow of data packets through the network infrastructure and represents the separation of the data transmitted from the information used to process the transmission. The Data Plane 225 forwards traffic to the next hop along the route based on information gleaned from the packets. The Data Plane 225 in each of the portions 102, 104 includes at least a forwarding table 305. The forwarding table 305 basically provides a fast lookup for destination addresses using the information in the packets.

Returning to FIG. 1, the computing network 100 also includes a maintenance manager 106. The maintenance manager 106 may be a stand-alone program of some sort, such as an application, a procedure, a routine, or a daemon. In these embodiments, the maintenance manager 106 may be hosted anywhere in the computing network 100 that is convenient. However, in most embodiments the maintenance manager 106 will be distributed across the nodes P1, P2, P3. For example, as described above relative to FIG. 2, the node P1 includes a plurality of instructions 215 that, when executed by the processor 200, perform a method as described and claimed below. These instructions 215 comprise a portion of the maintenance manager 106 hosted on the node P1 and distributed across the other nodes P2, P3 of the computing network 100.

Figure 4:
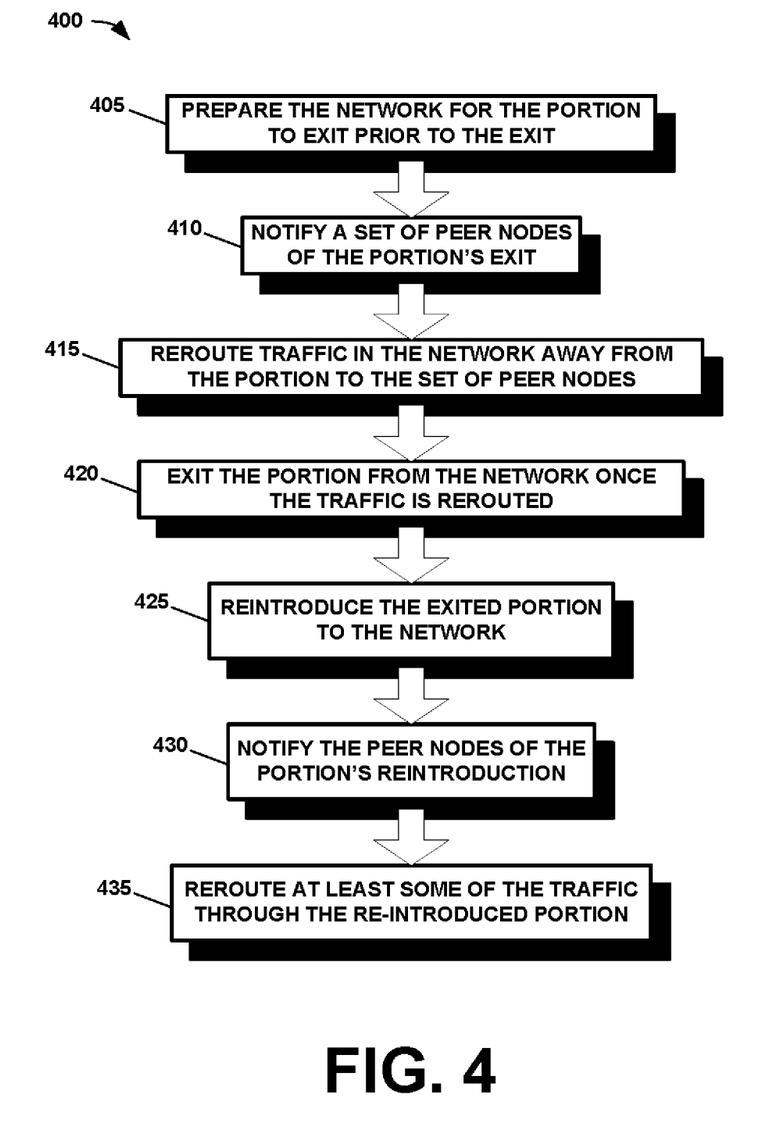
FIG. 4 illustrates a method for use in exiting a portion of a node from an Internet Protocol, Layer 3, virtual network in accordance with some embodiments.

Referring to FIG. 1 and FIG. 4 collectively, the maintenance manager 106, shown in FIG. 1, performs a method 400, shown in FIG. 4, for use in exiting a portion of a node from an Internet Protocol, Layer 3, virtual network. For instance, perhaps the node P1 is to undergo some form of maintenance that will take the entire node P1 down so that it is removed from both virtual network A and virtual network B. For another instance, perhaps the virtual network A is to undergo maintenance so that the portion of node P1 on which the portion 102 of virtual network A is hosted will be temporarily removed or exited from the computing network 100. It is expected that this maintenance will not change the configuration of virtual network B or to impair the flow of traffic on either the virtual network A or virtual network B.

Figure 5:
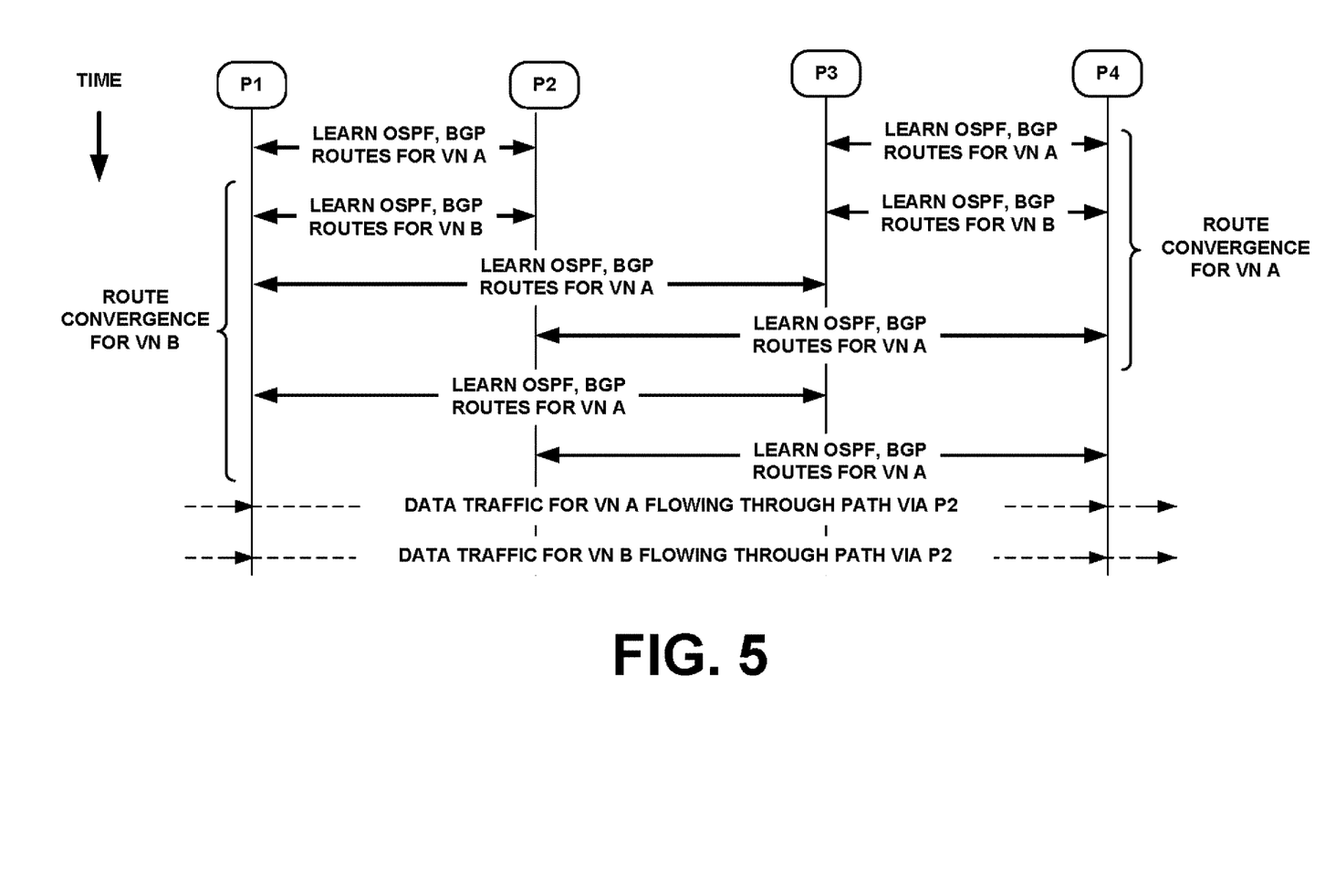
FIG. 5 graphically illustrates convergence of the Control Plane.

Typically, for L3 traffic, this is achieved in the present disclosure by re-converging routing protocols from the Control Plane 220 to an alternative router that is a routing peer such as node P2. The convergence is graphically illustrated in FIG. 5 for a four-node network not otherwise shown. Convergence is the state in which the nodes of the Control Plane have all discovered the alternative routes and updated the routing tables. Once Control Plane 220 is converged, it will push its route changes into the forwarding tables. Then it switches the data traffic over to an alternative path via the routing peer before taking virtual network A into a maintenance phase.

More particularly, the method 400 begins by preparing (at 405) the network for the portion to exit prior to the exit. This includes notifying (at 410) a set of peer nodes of the portion's exit; and rerouting (at 415) traffic in the virtual network A way from the portion to the set of peer nodes. So, assuming portion 102 of the node P1 in FIG. 1 is to exit the network, the node P1 notifies the nodes P2 and P3 that the portion 102 is going into maintenance mode. The OSPF protocol is then invoked to discover alternative routes using known techniques such as Router/Network Link State Advertisement ("LSA"), BGP with Autonomous System ("AS")-PATH prepend, intermediate system-to-intermediate system ("ISIS") protocol with over-load-bit, and routing information protocol ("RIP") with infinite cost. Note that at this point the nodes P1, P2, and P3 of virtual network A are taking Control Plane 220 action even as the traffic is flowing through the old instance of the Data Plane 225.

Once the Control Plane 220 has converged in expectation of the portion 102 of node P1 to exit, the node P1 then breaks its adjacency peer relations with its peer nodes, P2 and P3 in the illustrated embodiment. The information from the routing tables 300 of the virtual network A is then pushed down into the forwarding tables 325. This effectively begins the process of changing traffic flow away from the portion 102 of the node P1 to its peer nodes as packets finish their current hop and are re-routed.

Once the traffic flow rerouting is fully implemented and traffic is no longer flowing to the portion 102 of the node P1, the portion 102 has exited (at 420, FIG. 4) to virtual network A. Note that the portion 104 of the node P1 is still in the virtual network B and that exiting the portion 102 has not changed the virtual network B or affected its traffic flow. Furthermore, because of the orderly rerouting, the traffic flow in virtual network A has not been adversely impacted. The maintenance can then be performed without any drop in L3 traffic.

The method 400, shown in FIG. 4, then continues by reintroducing (at 425) the exited portion to the virtual network. The reintroduction (at 425) includes notifying (at 430) the peer nodes of the portion's reintroduction and rerouting (at 435) at least some of the traffic through the re-introduced portion. Again referring to FIG. 1, the node P1 notifies its peer nodes P2, P3 that is it coming out of maintenance through a normal configuration restart. Side route/LSA/topology exchange then occurs and SPF/route calculations are performed and pushed down to the forwarding tables 305 in the Data Planes 225. Once packets complete their current hops, the new forwarding tables will then redirect them on the recalculated routes that include the re-introduced portion 102 of the node P1. Once again, the orderly re-routing ensures that reintroduction of the portion 102 will not result in a drop in L3 traffic.

Figure 6A:
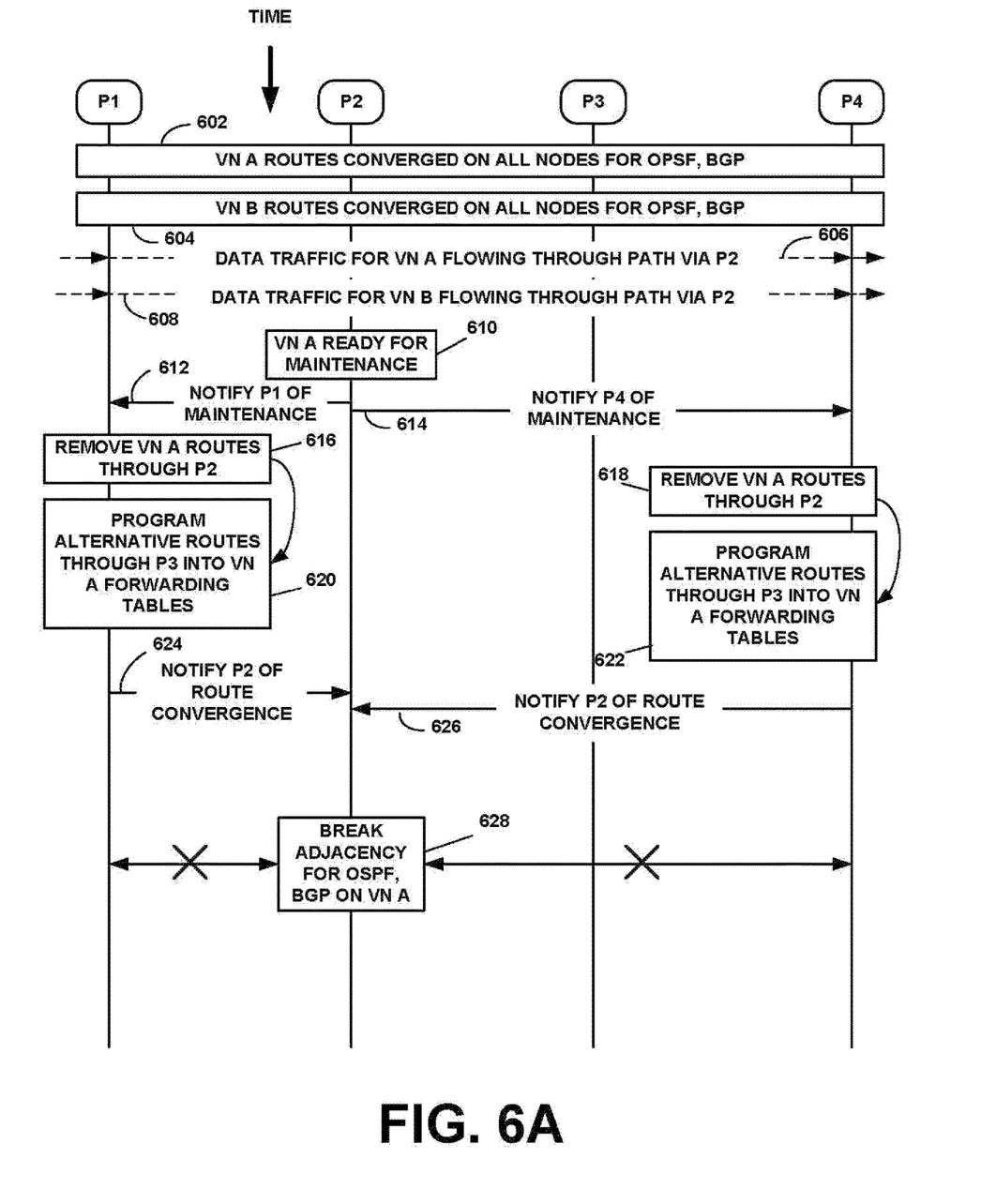
FIG. 6A-FIG. 6B illustrate a method in accordance with some embodiments.
Figure 6B:
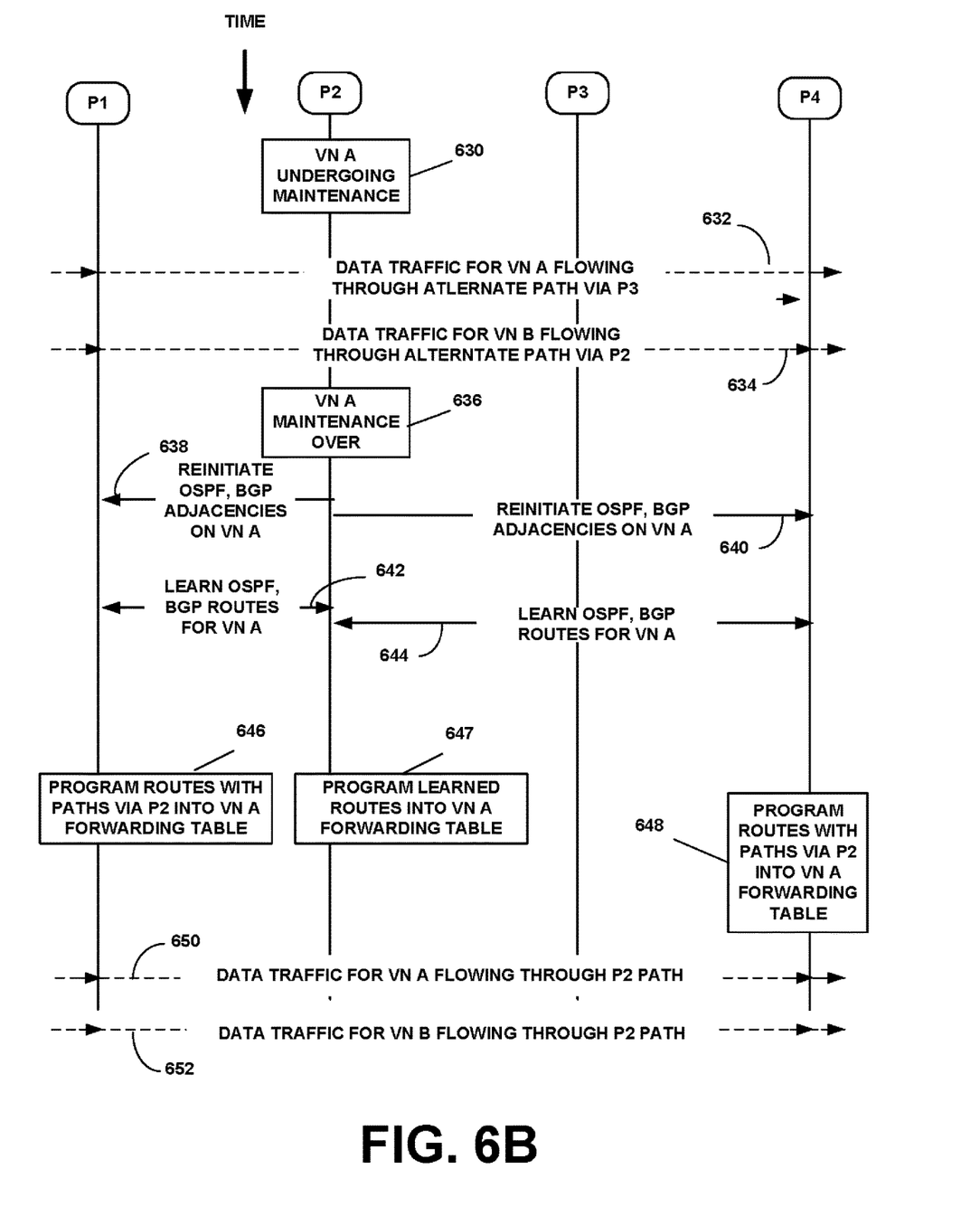

FIG. 6A-FIG. 66 illustrate a method in accordance with some embodiments. The method is practiced on a four-node computing network otherwise similar to the computing network 100 of FIG. 1 and the node P2 is to be exited from the virtual network A. The virtual network A and virtual network B are both up and running and so, as indicated at 602, 604, routes on the virtual networks A and B are converged on all nodes for OPSF and BGP. Data traffic is also flowing through paths including P2 as indicated at 606, 608.

At 610, the virtual network A is ready for maintenance. The node P2 notifies the nodes P1 and P4 that it is exiting for maintenance at 612, 614. Routes through P2 in virtual network A are then removed for nodes P1 and P4 at 616, 618 and alternative routes programmed into the routing tables 300 and pushed down into the forwarding tables 305 at 620, 622. Once convergence has been reached, the nodes P1 and P4 notify the node P2 at 624, 626. The node P2 breaks its adjacency relationships for OSPF and BGP on the virtual network A at 628.

Virtual network A then undergoes maintenance on the node P2 at 630. During the maintenance, data traffic for the virtual network A flows through alternative paths that do not include the node P2 at 632, 634. The maintenance of virtual network A on the node P1 concludes at 636.

The node P2 then reinitiates adjacency relationships at 638, 640 with the nodes P1 and P4 on the virtual network A. The node P2 then learns the OSPF and BGP routes to the nodes P1 and P4 at 642, 644. The routes including P2 are then programmed to the routing tables of the nodes P1, P2 and P4 and pushed down into the routing tables at 646, 647, 648. Data traffic then begins to flow through the virtual network A on routes including the node P1.

Some embodiments may include a feature whereby the portion of the node to be exited is exited directly from the virtual network directly without first preparing the network. For example, if the maintenance period is to exceed some threshold period of time. Or, if the reintroduction takes longer than some threshold period of time, the portion can then be directly exited without the preparation on the assumption that some problem has been encountered with the changes made during the maintenance.

Some embodiments may impose conditions on the treatment of certain types of routes. For example, ordinarily a routing protocol will only share information with a node running the same protocol. This tends to limit information sharing by the routing protocol by which the information is acquired. Sometimes, such information is redistributed to another protocol. So, for example, a route might be discerned using BGP and get redistributed into OSPF. In these situations, in peer nodes, these routes are treated as OSPF routes only and in the node to be exited the local Routing Information Base ("RIB") should make the route not reachable by assigning an infinite cost.

For another example, sometimes routes are "leaked" between two different VRF network. More particularly, a routing information for a route in one particular virtual network may be leaked into another virtual network. The second virtual network then has the routing information for the first virtual network outside of the usual processes used to maintain and update routing information in the first virtual network. In FIG. 1, for example, virtual network A might leak a route to virtual network B. Leaked routes are treated in the similarly to redistributed routes.

The present disclosure consequently presents a technique by which the performance of a VRF network may be improved by permitting portions of a node, or even entire nodes, to be exited from the VRF network without a drop in L3 traffic. The technique may permit maintenance to be performed per L3 protocol and on a node without impacting other VRFs that may be running on the same physical equipment of the node. The technique is independent of the L2 network and the specific topology of the VRF network (excepting only alternative route availability). Since traffic continues to flow unabated through the VRF, the technique puts less pressure on the maintenance phase duration. The technique also works for different kinds of routes and combinations of routes. Note that not all embodiments will necessarily manifest all these characteristics and that, to the extent they manifest one such characteristic, they may do so to different degrees.

Some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "accessing", "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the technique disclosed herein are usually encoded on some form of program storage medium or implemented over some type of transmission medium. The program storage medium is a non-transitory medium and may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The technique is not limited by these aspects of any given implementation.

The embodiments discussed above employ the claimed subject matter in the context of one or more virtual networks. However, this is not necessary in all embodiments. In some embodiments, the subject matter claimed below may be used in a physical network.

This concludes the detailed description. The particular embodiments disclosed above are illustrative only, as examples described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the appended claims. Accordingly, the protection sought herein is as set forth in the claims below.

What is claimed is:

1. A method for use in exiting a portion of a node from an Internet Protocol, Layer 3 network, comprising:
preparing the network for the portion to exit prior to the exit while traffic is flowing to the portion, including:
notifying a set of peer nodes of the portion's exit;
rerouting traffic in the network away from the portion to the set of peer nodes, including
breaking adjacency peer relationships with the peer nodes;
calculating alternative route paths;
downloading the calculated alternative route paths to the peer nodes; and
redirecting traffic to the downloaded alternative route paths;
exiting the portion from the network once the traffic is rerouted; and
reintroducing the exited portion to the network, including:
notifying the peer nodes of the portion's reintroduction; and
rerouting at least some of the traffic through the re-introduced portion.

2. The method of claim 1, wherein the at least the portion of the node includes the entire node.

3. The method of claim 1, further comprising performing maintenance on the exited portion before reintroducing the exited portion to the network.

4. The method of claim 1, further comprising leaving an unexited portion of the node in the network.

5. The method of claim 1, wherein rerouting traffic in the network away from the portion to the set of peer nodes includes redistributing at least one route.

6. The method of claim 5, wherein:
in the peer nodes, the redistributed route is treated as an Open Shortest Path First route; and
in the portion, the local Routing Information Base indicates the redistributed route is not reachable.

7. The method of claim 1, wherein rerouting traffic in the network away from the portion to the set of peer nodes includes rerouting at least one leaked route.

8. The method of claim 7, wherein:
in peer nodes, the leaked route is treated as an Open Shortest Path First route; and
in the portion, the local Routing Information Base should indicate the leaked route is not reachable.

9. The method of claim 1, further comprising re-exiting the portion from the network if there is an error in the reintroduction.

10. A system, comprising:
a plurality of networks;
a plurality of nodes across which the networks are distributed;
a processor;
a maintenance manager that, when executed by the processor:
prepares the network for the portion to exit prior to the exit while traffic is flowing to the portion, including:
network notifying a set of peer nodes in the network for an exit for a portion of a node; and
rerouting traffic in the network away from the portion to the set of peer nodes including;
breaking adjacency peer relationships with the peer nodes;
calculating alternative route paths;
downloading the calculated alternative route paths to the peer nodes; and
redirecting traffic to the downloaded alternative route paths;
exits the portion from the network once the traffic is rerouted; and
reintroduces the exited portion to the network, including:
notifying the peer nodes of the portion's reintroduction; and
rerouting at least some of the traffic through the re-introduced portion.

11. The system of claim 10, wherein the portion includes the entire node.

12. The system of claim 10, further comprising leaving an unexited portion of the node in the network.

13. The system of claim 10, the maintenance manager, when executed by the processor to re-exiting the portion from the network if there is an error in the reintroduction.

14. A non-transitory computer-readable medium storing computer-executable instructions that when executed by a computer cause the computer to:
network notify a set of peer nodes in a network for an exit for a portion of a node; and
reroute traffic in the network away from the portion to the set of peer nodes;
exit the portion from the network once the traffic is rerouted; and
reintroduce the exited portion to the network, including:
notifying the peer nodes of the portion's reintroduction; and
rerouting at least some of the traffic through the re-introduced portion; and
re-exiting the portion from the network if there is an error in the reintroduction.

15. The non-transitory computer-readable medium of claim 14, wherein the at least the portion of the node includes the entire node.

16. The non-transitory computer-readable medium of claim 14, wherein the instructions, when executed by the computer, further cause the computer to leave an unexited portion of the node in the network.

17. The non-transitory computer-readable medium of claim 14, wherein the instructions, when executed by the computer, further cause the computer to prepare the network for the portion to exit prior to the exit while traffic is flowing to the portion.

* * * * *